US012769233B2

(12) United States Patent
Li et al.

(10) Patent No.: US 12,769,233 B2
(45) Date of Patent: Oct. 20, 2026

(54) PHOTOGRAPHIC FIXING TEMPERATURE CONTROL METHOD

(71) Applicant: Zhuhai Pantum Electronics Co., Ltd., Zhuhai (CN)

(72) Inventors: Ronghua Li, Zhuhai (CN); Kangjian Chen, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/625,951

(22) Filed: Apr. 3, 2024

(65) Prior Publication Data

US 2024/0353780 A1 Oct. 24, 2024

(30) Foreign Application Priority Data

Apr. 19, 2023 (CN) ......................... 202310426198.9

(51) Int. Cl.
*G03G 15/20* (2006.01)

(52) U.S. Cl.
CPC ..... *G03G 15/2039* (2013.01); *G03G 15/2046* (2013.01); *G03G 15/205* (2013.01)

(58) Field of Classification Search
CPC ........... G03G 15/2039; G03G 15/2046; G03G 15/205
USPC ............................................ 399/69; 219/216
See application file for complete search history.

(56) References Cited

U.S. PATENT DOCUMENTS

| | | | | |
|---|---|---|---|---|
| 5,659,844 A * | 8/1997 | Fujiwara | G03G 15/2039 399/328 |
| 5,946,526 A | 8/1999 | Kim | |
| 2005/0163525 A1* | 7/2005 | Watabe | G03G 15/2046 399/70 |
| 2008/0170872 A1* | 7/2008 | Kobayashi | G03G 15/2039 399/69 |
| 2014/0219672 A1* | 8/2014 | Samei | G03G 15/2039 399/334 |
| 2016/0282777 A1* | 9/2016 | Shibuya | G03G 15/2039 |
| 2018/0067427 A1* | 3/2018 | Obayashi | G03G 15/2039 |
| 2019/0101854 A1* | 4/2019 | Taguchi | G03G 15/2028 |
| 2019/0243292 A1 | 8/2019 | Imaizumi et al. | |
| 2019/0286022 A1 | 9/2019 | Fukunaga et al. | |

FOREIGN PATENT DOCUMENTS

| | | | |
|---|---|---|---|
| CN | 1209589 | A | 3/1999 |
| CN | 102298297 | A | 12/2011 |
| CN | 102621858 | A | 8/2012 |
| CN | 115509104 | A | 12/2022 |
| EP | 3825774 | A1 | 5/2021 |

(Continued)

OTHER PUBLICATIONS

The European Patent Office (EPO) The Extended European Search Report for Application No. 24167842.4, Sep. 16, 2024 7 Pages.

*Primary Examiner* — Robert B Beatty
(74) *Attorney, Agent, or Firm* — Anova Law Group, PLLC

(57) ABSTRACT

A photographic fixing temperature control method includes: controlling a photographic fixing module to heat and fix a first part of a recording medium according to a first temperature; and controlling the photographic fixing module to heat and fix a second part of the recording medium according to a second temperature. The first part is located in front of the second part and the first temperature is lower than the second temperature.

8 Claims, 12 Drawing Sheets

(56) References Cited

FOREIGN PATENT DOCUMENTS

| | | | |
|---|---|---|---|
| JP | H02117563 | A | 9/1990 |
| JP | H0675505 | A | 3/1994 |
| JP | H11133799 | A | 5/1999 |
| JP | 2002244478 | A | 8/2002 |
| JP | 2007065313 | A | 3/2007 |
| JP | 2007206327 | A | 8/2007 |
| JP | 2012032654 | A | 2/2012 |
| JP | 2021189272 | A | 12/2021 |
| KR | 20080034357 | A | 4/2008 |

* cited by examiner

PHOTOGRAPHIC FIXING TEMPERATURE CONTROL METHOD

CROSS-REFERENCE TO RELATED APPLICATION

This application claims the priority of Chinese Patent Application No. 202310426198.9, filed on Apr. 19, 2023, the content of which is incorporated herein by reference in its entirety.

TECHNICAL FIELD

The present disclosure generally relates to the field of image forming technology and, more particularly, relates to a photographic fixing temperature control method.

BACKGROUND

An image forming device is a device that forms an image on a recording medium through an imaging principle, such as a printer, a copier, a fax machine, a multifunctional image making and copying device, an electrostatic printing device, or any other similar device.

The image forming device usually includes a photographic fixing module. The photographic fixing module includes a heating roller and a pressure roller. The heating roller and the pressure roller are pressed and collided to form a nip. When a paper passes through the nip, the paper is heated such that a toner image on the paper is fixed to the paper. However, when the image forming device is cold-started, especially when the image forming operation is performed at low temperature cold start, the paper and the pressure roller absorb a large amount of heat generated by the heating roller, causing insufficient heat in the heating roller. Correspondingly, a second half of the first page of paper or even a first half of the second page of paper is prone to a decrease in fixation firmness, which in turn affects the quality of image formation.

In existing technologies, the control temperature of the heating roller is generally increased overall to ensure that the heating roller has enough heat to fix the toner image on the paper. Although this method can avoid the problem of reduced photographic fixing firmness due to insufficient temperature, when setting the conventional temperature for the first half of the first page of paper is enough, overall increasing the control temperature of the heating roller will cause waste of heat and lead to higher energy consumption.

SUMMARY

One aspect of the present disclosure provides a photographic fixing temperature control method. The method includes: controlling a photographic fixing module to heat and fix a first part of a recording medium according to a first temperature; and controlling the photographic fixing module to heat and fix a second part of the recording medium according to a second temperature. The first part is located in front of the second part and the first temperature is lower than the second temperature.

Another aspect of the present disclosure provides a photographic fixing temperature control method. The method includes: when receiving a continuous image forming operation instruction, performing photographic fixing temperature control according to a first photographic fixing temperature control strategy for a first page of recording media; and performing photographic fixing temperature control according to a second photographic fixing temperature control strategy for the recording media after a second page. The first photographic fixing temperature control strategy includes: controlling a photographic fixing module to heat for a second duration $\Delta T2$ according to a third temperature; controlling the photographic fixing module to heat and fix a first part of a recording medium according to a first temperature; and controlling the photographic fixing module to heat and fix a second part of the recording medium according to a second temperature, wherein the first part is located in front of the second part, the first temperature is lower than the second temperature, and the third temperature is lower than the first temperature. The second photographic fixing temperature control strategy includes: controlling the photographic fixing module to heat and fix a first part of a recording medium according to a first temperature; controlling the photographic fixing module to heat and fix a second part of the recording medium according to a second temperature; and controlling the photographic fixing module to stop heating and fixing after heating and fixing a last page of the recording medium in the continuous image forming operation instruction.

Another aspect of the present disclosure provides a photographic fixing temperature control method. The method includes: when receiving an interval image forming operation instruction, performing photographic fixing temperature control according to a first photographic fixing temperature control strategy. The first photographic fixing temperature control strategy includes: controlling a photographic fixing module to heat for a second duration $\Delta T2$ according to a third temperature; controlling the photographic fixing module to heat and fix a first part of a recording medium according to a first temperature; and controlling the photographic fixing module to heat and fix a second part of the recording medium according to a second temperature, wherein the first part is located in front of the second part, the first temperature is lower than the second temperature, and the third temperature is lower than the first temperature.

Another aspect of the present disclosure provides an image forming device. The device includes a photographic fixing module and a controller. The controller is configured to: control the photographic fixing module to heat and fix a first part of a recording medium according to a first temperature; and control the photographic fixing module to heat and fix a second part of the recording medium according to a second temperature. The first part is located in front of the second part and the first temperature is lower than the second temperature.

Another aspect of the present disclosure provides a non-transitory computer-readable storage medium. The storage medium is configured to store a program; and when the program is executed, a device where the computer-readable storage medium is located is configured to: control the photographic fixing module to heat and fix a first part of a recording medium according to a first temperature; and control the photographic fixing module to heat and fix a second part of the recording medium according to a second temperature. The first part is located in front of the second part and the first temperature is lower than the second temperature.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
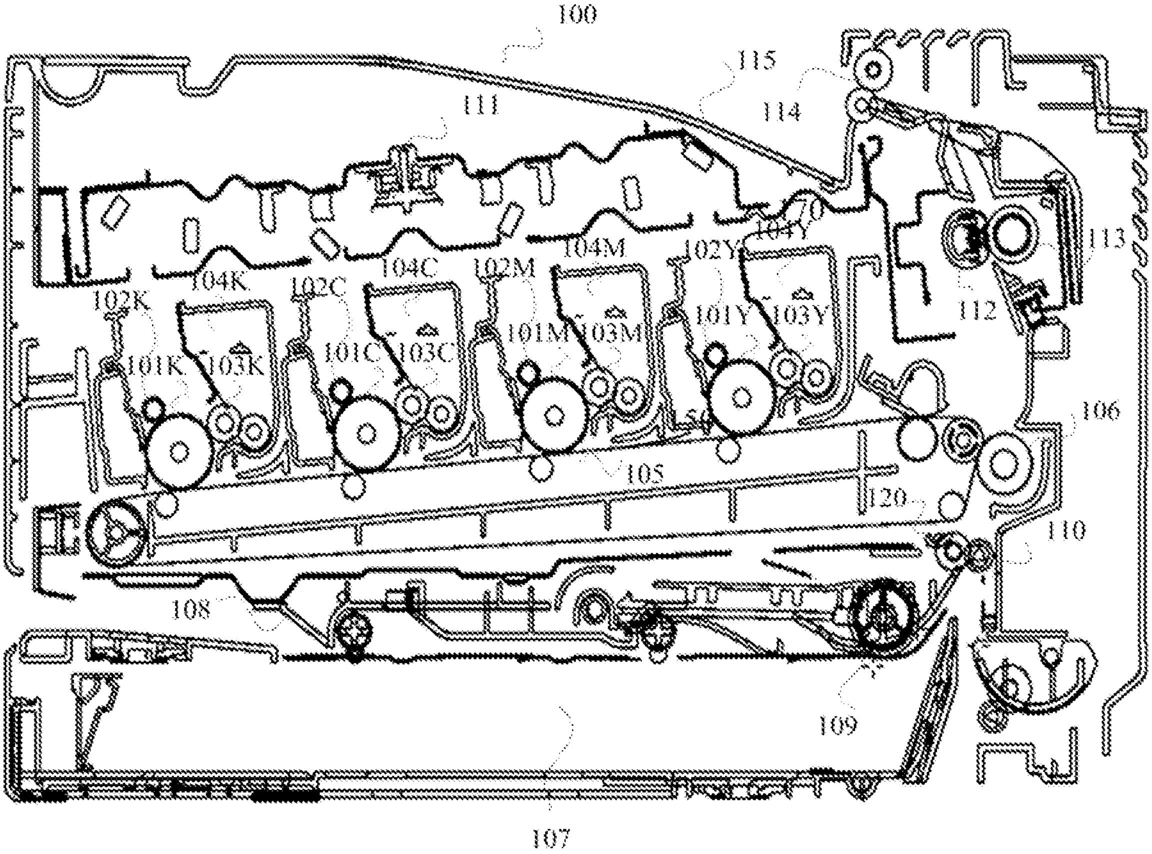
FIG. 1 illustrates an exemplary image forming device according to various disclosed embodiments of the present disclosure.

Reference will now be made in detail to exemplary embodiments of the disclosure, which are illustrated in the accompanying drawings. Wherever possible, the same reference numbers will be used throughout the drawings to refer to the same or like parts. The embodiments disclosed herein are exemplary only. Other applications, advantages, alternations, modifications, or equivalents to the disclosed embodiments are obvious to those skilled in the art and are intended to be encompassed within the scope of the present disclosure.

It should be noted that the terms used in the embodiments of the present disclosure are only for the purpose of describing specific embodiments, and are not intended to limit the scope of the present disclosure. As used in the embodiments of the present disclosure and the appended claims, the singular forms such as "a", "said" and "the" are also intended to include the plural forms unless the context clearly indicates otherwise.

It should be understood that the term "and/of" used in this specification is just for relationship description of related objects, indicating that there can be three kinds of relationships. For example, A and/or B, which can mean that A exists alone, A and B exist at the same time, and B exists alone. In addition, the character "/" in this specification generally indicates that the related objects are in an "of" relationship.

The present disclosure provides an image forming device. Embodiments shown in FIG. 1 where the image forming device 100 is a color laser printing device are used as an example only to describe the present disclosure, and do not limit the scope of the present disclosure. In other embodiments, the image forming apparatus 100 may also be a black and white laser printing device, a fax machine, a copy machine, etc.

In the image forming device 100 provided by one embodiment of the present disclosure, an optical scanning unit 111 may be in the form of a single laser scanning unit (LSU), including four optical paths. Four charging rollers 102Y-K may be used to charge surfaces of four photosensitive drums 101Y-K respectively. Laser beams respectively emitted by the four optical paths of the optical scanning unit 111 may form electrostatic latent images on the surfaces of the photosensitive drums 101Y-K. Four developing rollers 103Y-K may be used to develop toner images of corresponding colors on the surfaces of the photosensitive drums 101Y-K respectively. The image forming device 100 may adopt a secondary transfer method. That is, the four photosensitive drums 101Y-K sequentially transfer the toner images to a transfer belt 105. There may be a certain transfer voltage on the transfer belt 105, such that the toner images on the surfaces of the photosensitive drums 101Y-K are more easily adsorbed to the transfer belt 105. Subsequently, the color toner images formed on the transfer belt 105 may be secondarily transferred to a paper via a secondary transfer roller 106. A paper feed cassette 107 may be used to store the paper, and the pickup roller 109 may be used to transport the paper stored in the paper feed cassette 107 to a transport path (i.e., a paper path described below). The transport roller 110 may transport the paper to the secondary transfer roller 106.

The secondary transfer roller 106 may transport the paper with the transferred toner image to the nip area between the heating roller 112 and the pressure roller 113. The heating roller 112 and the pressure roller 113 may be used to fix the toner image on the paper. The heating roller 112 may use a ceramic heating method or a halogen lamp heating method. The heating roller 112 and the pressure roller 113 may transport the fixed paper to the discharge roller 114, and the discharge roller 114 may discharge the paper to the discharge paper box 115 and stack it.

When the image forming device 100 is cold-started, especially when the image forming operation is performed at low temperature cold start, the paper and the pressure roller 113 absorb a large amount of heat generated by the heating roller 112, causing insufficient heat in the heating roller 112. Correspondingly, a second half of the first page of paper or even a first half of the second page of paper is prone to a decrease in fixation firmness, which in turn affects the quality of image formation.

In existing technologies, the control temperature of the heating roller 112 is generally increased overall to ensure that the heating roller 112 has enough heat to fix the toner image on the paper. Although this method can avoid the problem of reduced photographic fixing firmness due to insufficient temperature, when setting the conventional temperature for the first half of the first page of paper is enough, overall increasing the control temperature of the heating roller 112 will cause waste of heat and lead to higher energy consumption.

The present disclosure provides a photographic fixing temperature control method. In the present disclosure, different temperatures may be used for heating and photographic fixing within the same page of paper, and temperature compensation may be performed for heating and photographic fixing of the second part of the paper. This may effectively save energy while ensuring the firmness of the photographic fixation of the paper.

Figure 2:
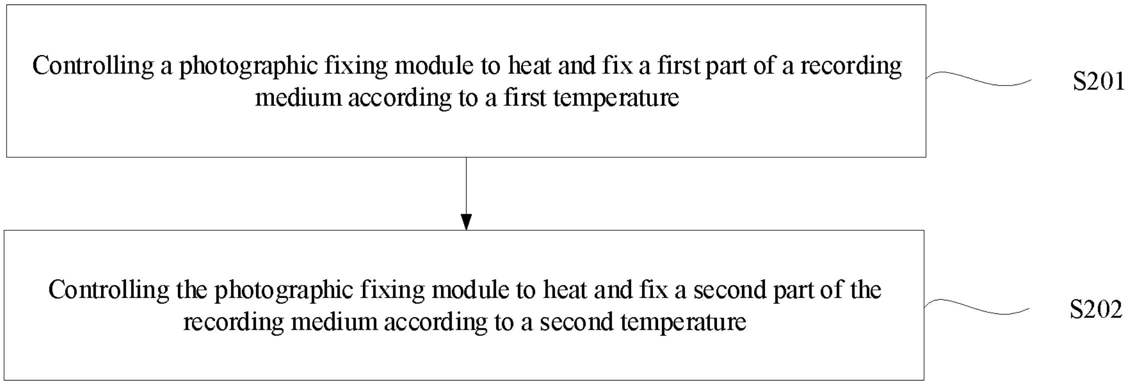
FIG. 2 illustrates a flowchart of an exemplary photographic fixing temperature control method according to various disclosed embodiments of the present disclosure.

FIG. 2 illustrates a flowchart of an exemplary photographic fixing temperature control method provided by one embodiment of the present disclosure. The method may be applied to the image forming device shown in FIG. 1. As shown in FIG. 2, the method may include S201 and S202.

In S201, a photographic fixing module may be controlled to heat and fix a first part of a recording medium according to a first temperature.

The photographic fixing module may include the heating roller and the pressure roller; and the recording medium may be a carrier used to carry toner images. In one embodiment, the recording medium may be a paper. Of course, the recording medium may also be carriers made of other materials in other embodiments. The present disclosure does not specifically limit this.

Figure 3:
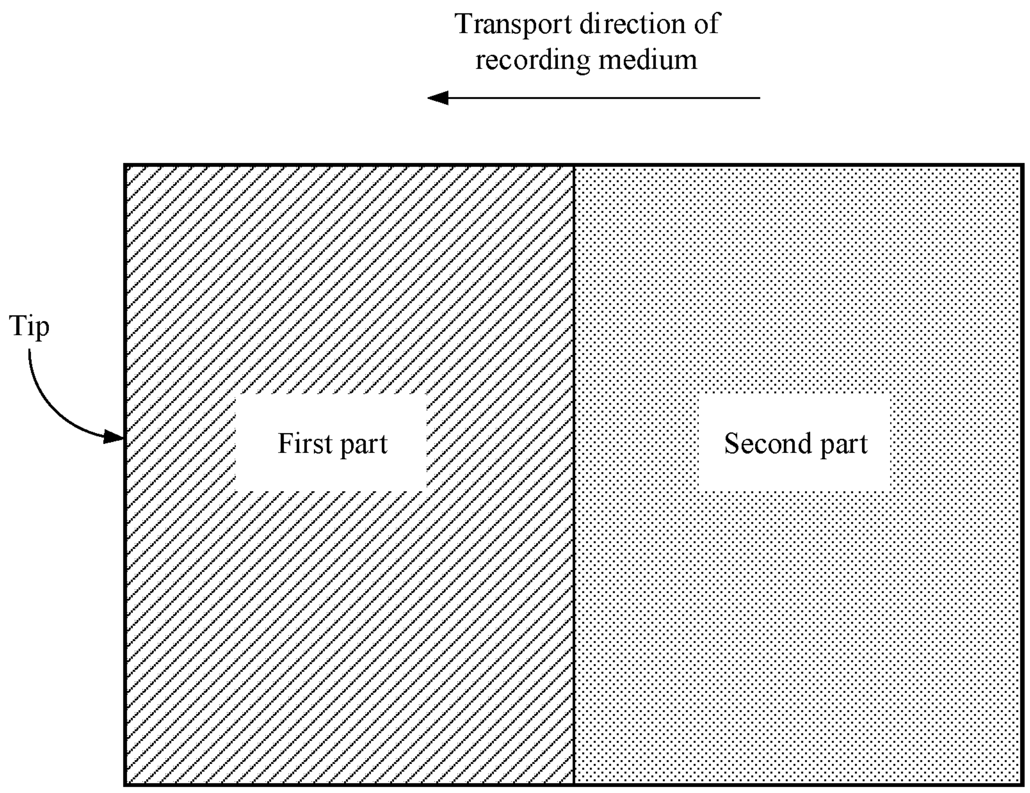
FIG. 3 illustrates an exemplary recording medium according to various disclosed embodiments of the present disclosure.

To effectively save energy while ensuring the fixation firmness of the paper, in the present embodiment, one page of the recording medium may be divided into a first part and a second part (as shown in FIG. 3), and heating and photographic fixing may be performed at different temperatures on the first part and the second part respectively. In one embodiment, the first part may be located in the front of the second part (along the transport direction of the recording medium, the front end of the recording medium is the tip), and the photographic fixing module may be controlled to perform heating and photographic fixing on the first part of the recording medium at a lower first temperature (the first temperature is lower than a second temperature). Since the first part is located at the tip of the recording medium, when the first part of the recording medium reaches the photographic fixing module, the heat generated by the heating roller may not have been absorbed by the recording medium. Therefore, the lower first temperature may ensure the photographic fixing firmness of the first part.

In S202, the photographic fixing module may be controlled to heat and fix the second part of the recording medium according to the second temperature.

When the first part of the recording medium passes through the photographic fixing module, the heat generated by the heating roller may be absorbed by the first part of the recording medium. To ensure the photographic fixing firmness of the second part of the recording medium, the photographic fixing module may be controlled to perform heating and photographic fixing on the second part of the recording medium at the higher second temperature (the second temperature is larger than the first temperature), to realize temperature compensation for the heating and photographic fixing of the rear part of the recording medium.

In the present disclosure, different temperatures may be used for heating and photographic fixing within the same page of the recording medium, and temperature compensation may be performed for heating and photographic fixing of the rear part of the recording medium, thereby effectively saving energy while ensuring the photographic fixing firmness.

Figure 4A:
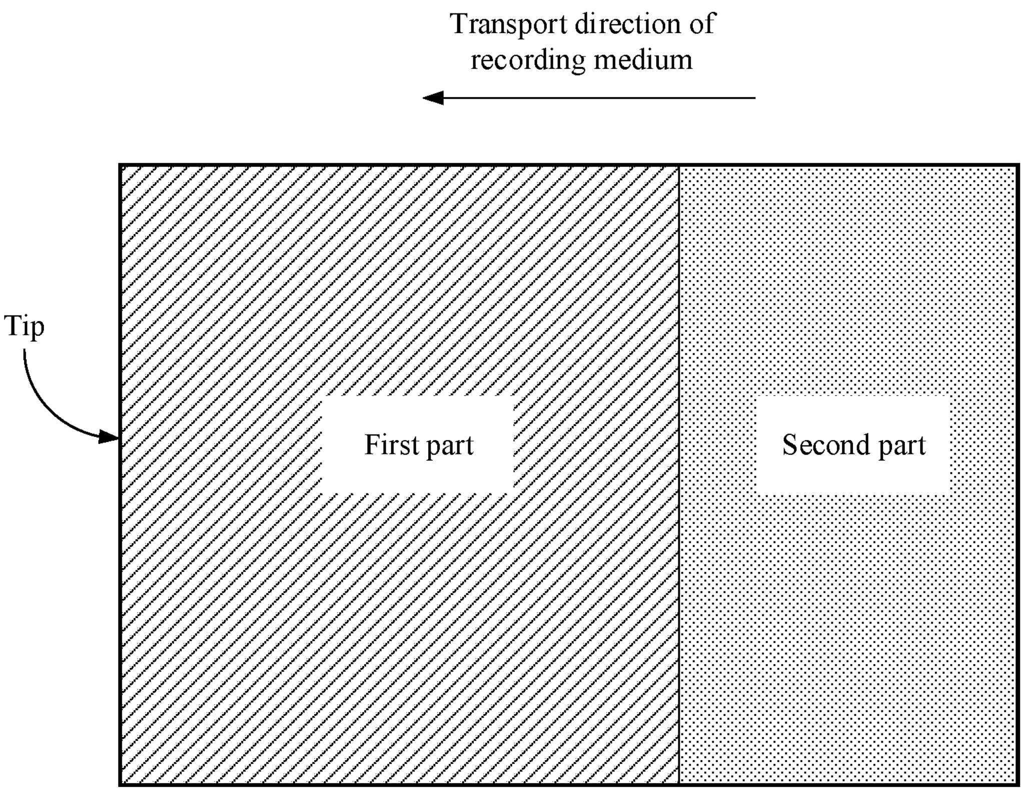
FIG. 4A illustrates another exemplary recording medium according to various disclosed embodiments of the present disclosure.
Figure 4B:
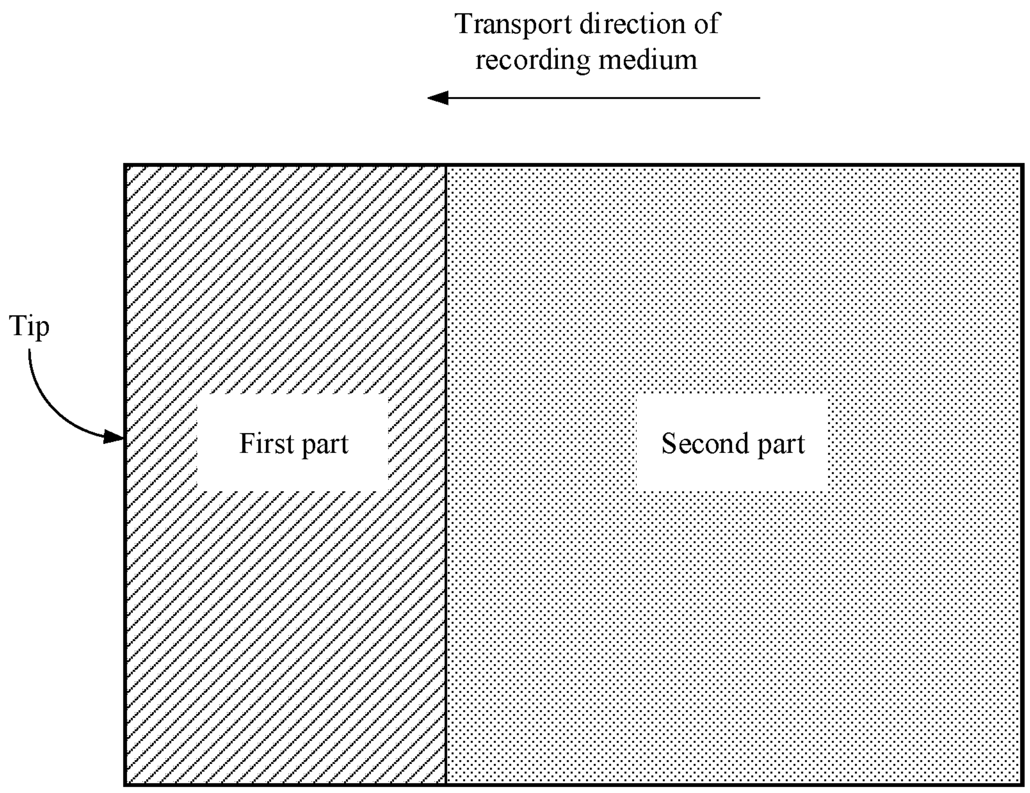
FIG. 4B illustrates another exemplary recording medium according to various disclosed embodiments of the present disclosure.

The present application does not limit the proportions of the first part and the second part of the recording medium, and those skilled in the art may make corresponding adjustments according to actual needs. For example, in one embodiment shown in FIG. 4A, the area corresponding to the first part in the recording medium may be larger than the area corresponding to the second part. In another embodiment shown in FIG. 4B, the area corresponding to the first part in the recording medium may be smaller than the area corresponding to the second part.

Figure 5A:
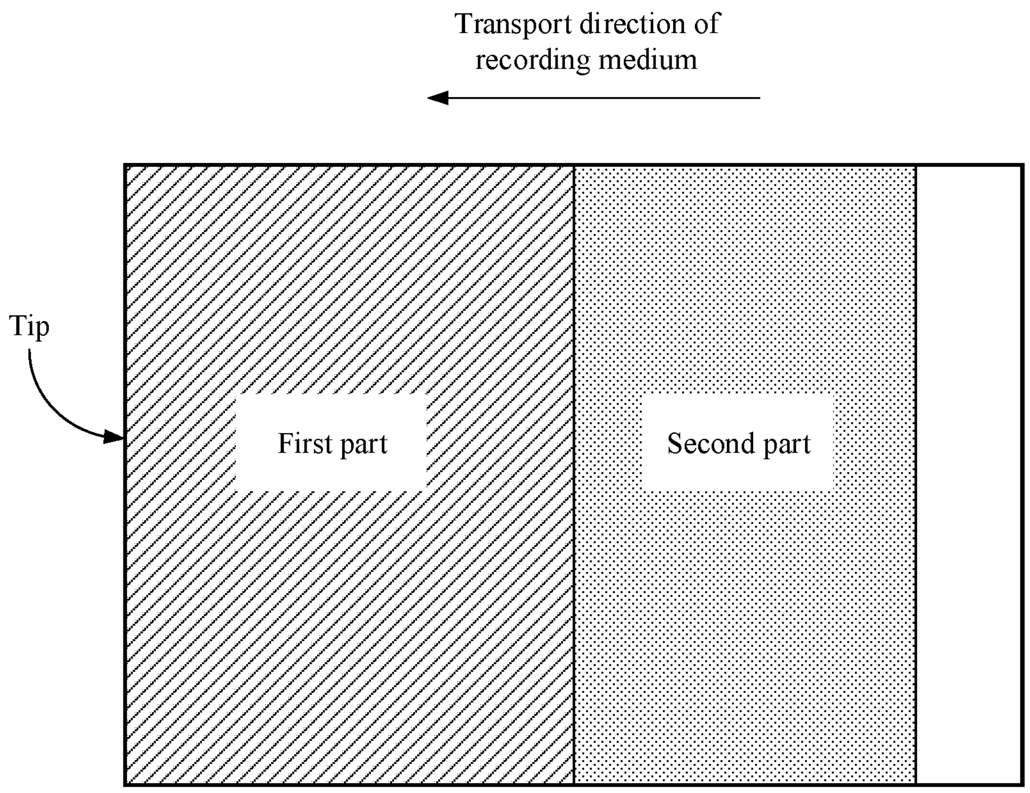
FIG. 5A illustrates another exemplary recording medium according to various disclosed embodiments of the present disclosure.
Figure 5B:
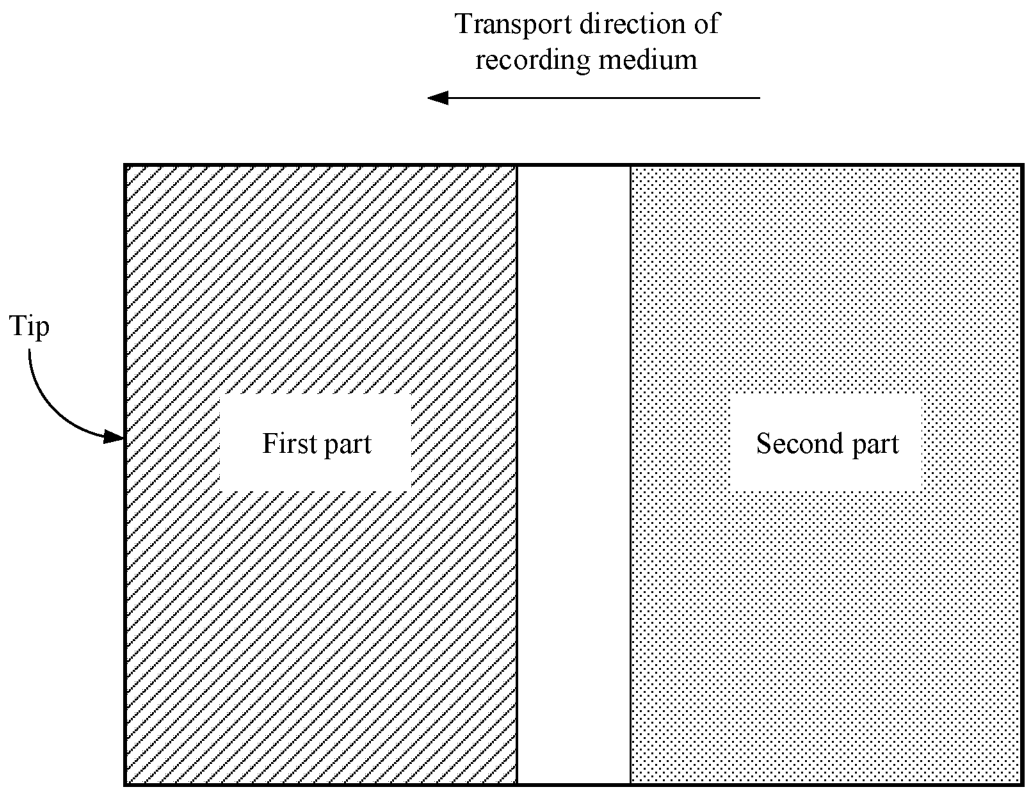
FIG. 5B illustrates another exemplary recording medium according to various disclosed embodiments of the present disclosure.
Figure 5C:
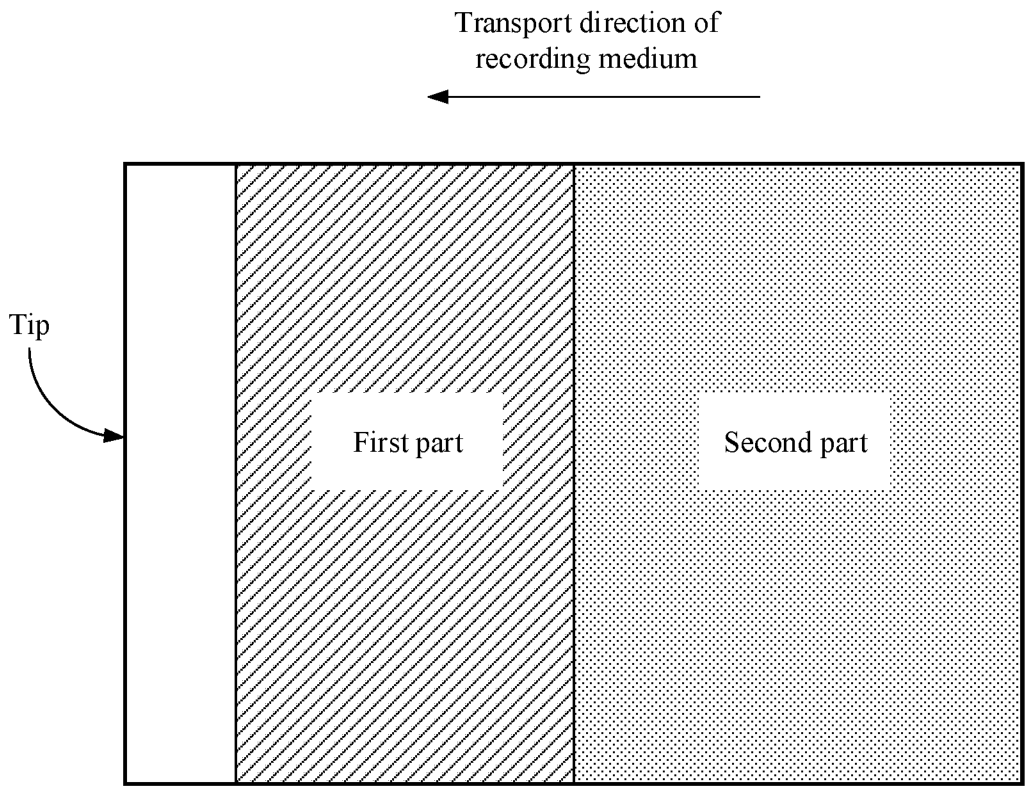
FIG. 5C illustrates another exemplary recording medium according to various disclosed embodiments of the present disclosure.

In the above embodiments, the recording medium may be divided into the first part and the second part, that is, the proportion of the first part plus the portion of the second part in the recording medium may be equal to 100%. In some other embodiments, those skilled in the art may set the first part and the second part according to actual needs, such that the proportion of the first part plus the portion of the second part in the recording medium is smaller than 100%, as shown in FIG. 5A, FIG. 5B, and FIG. 5C. The present disclosure has no specific limit on this.

In one embodiment, the photographic fixing module may be provided with a tip sensor and a discharge sensor. The tip sensor may be used to detect whether the tip of the recording medium enters the photographic fixing module, and the discharge sensor may be used to detect whether the end of the recording medium is discharged from the photographic fixing module. When the tip sensor detects that the tip of the recording medium enters the photographic fixing module, the timing may be started, and the photographic fixing module may be controlled to heat for the first time duration ΔT1 according to the first temperature, such that the photographic fixing module performs heating and photographic fixing on the first part of the recording medium according to the first temperature. After controlling the photographic fixing module to heat for the first time duration ΔT1 according to the first temperature, the photographic fixing module may be controlled to perform heating and photographic fixing according to the second temperature until the discharge sensor detects that the end of the recording medium is discharged from the photographic fixing module, thereby performing heating and photographic fixing on the second part of the recording medium according to the second temperature.

The photographic fixing temperature control logic according to the present embodiment will be described below with reference to the corresponding photographic fixing temperature control timing diagram.

Figure 6:
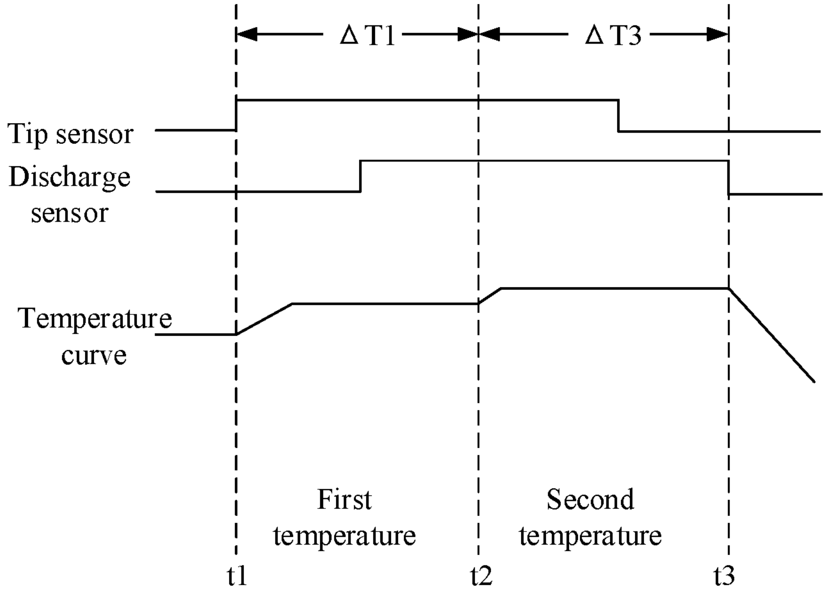
FIG. 6 illustrates a timing diagram of an exemplary photographic fixing temperature control method according to various disclosed embodiments of the present disclosure.

As shown in FIG. 6 which is a photographic fixing temperature control timing diagram, at the time point t1, the tip sensor may detect that the tip of the recording medium enters the photographic fixing module, the timing may be started, and the photographic fixing module may be controlled to perform heating and photographic fixing according to the first temperature. At a time point t2, the timing length may reach the first duration ΔT1 (t2−t1), the photographic fixing module may be controlled to perform heating and photographic fixing according to the second temperature. At a time point t3, the discharge sensor may detect that the end of the recording medium is discharged from the photographic fixing module, and heating and photographic fixing according to the second temperature may be stopped. That is, the photographic fixing module may be controlled to perform heating and photographic fixing according to the second temperature for a third duration ΔT3 (t3−t2).

Figure 7:
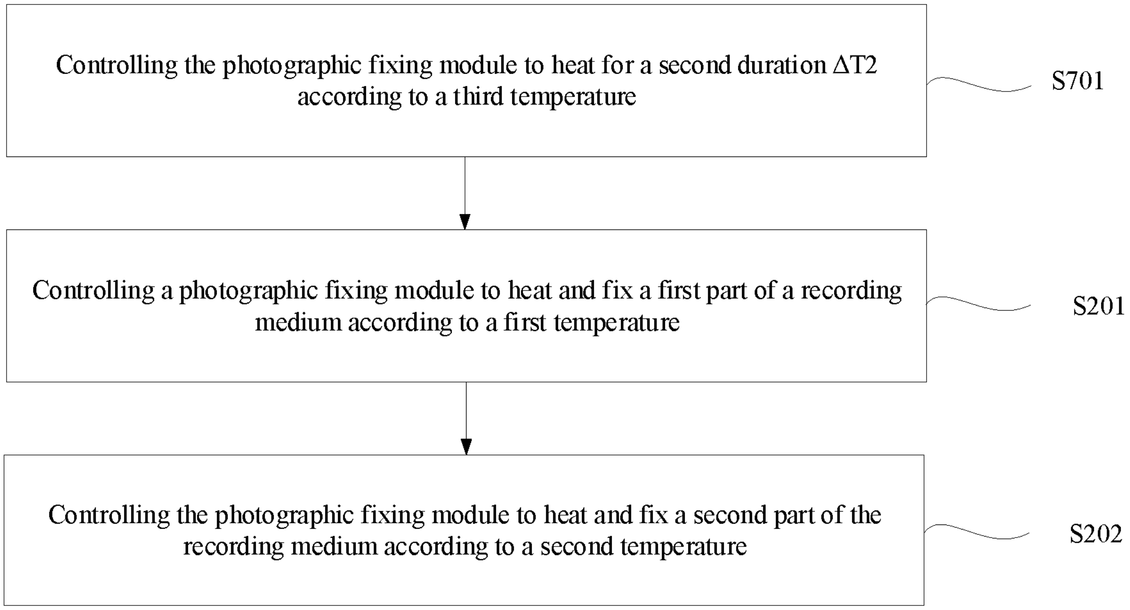
FIG. 7 illustrates a flowchart of another exemplary photographic fixing temperature control method according to various disclosed embodiments of the present disclosure.

In another embodiment shown in FIG. 7 which is a flowchart of another photographic fixing temperature control method according to the present embodiment, different from the photographic fixing temperature control method shown in FIG. 2, before S201, the method may further include:

S701: controlling the photographic fixing module to heat according to a third temperature for a second duration ΔT2.

When the image forming device performs an image forming operation during a cold start, for the first page of the recording medium, the photographic fixing module may need to be heated for a long time to reach the specified first temperature, which may affect the photographic fixing firmness of the first part of the first page of the recording medium. Therefore, in the present embodiment, before the photographic fixing module is controlled to heat and fix the first part of the recording medium according to the first temperature, the photographic fixing module may be preheating at the third temperature in advance for a second time duration ΔT2. The third temperature may be configured to be lower than the first temperature to save energy.

The photographic fixing temperature control logic according to the present embodiment will be described below with reference to the corresponding photographic fixing temperature control timing diagram.

Figure 8:
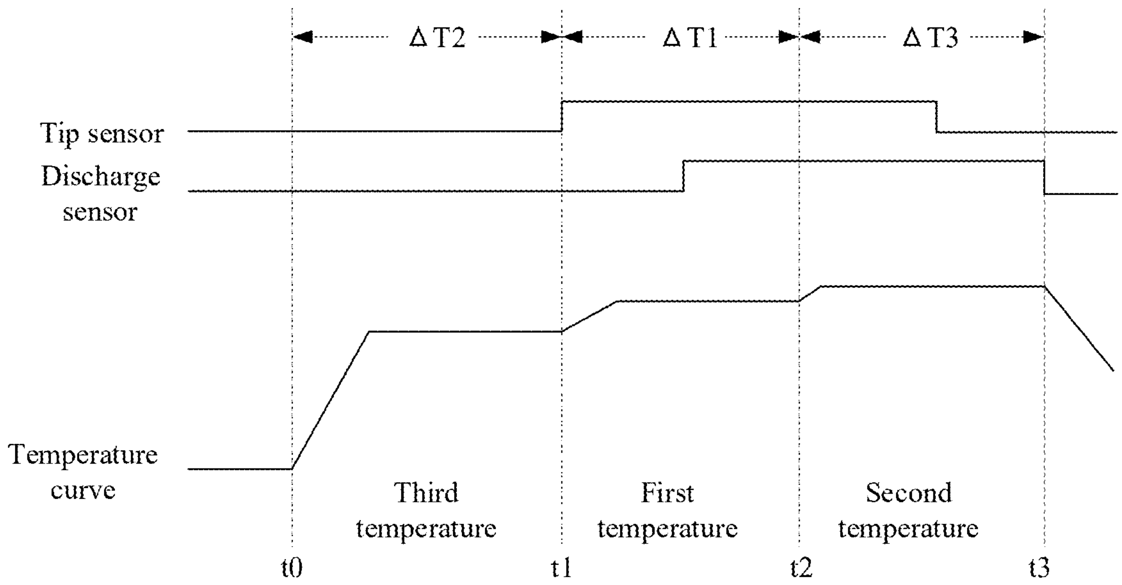
FIG. 8 illustrates a timing diagram of another exemplary photographic fixing temperature control method according to various disclosed embodiments of the present disclosure.

As shown in FIG. 8 which is a photographic fixing temperature control timing diagram according to the present embodiment, at the time point t0, the photographic fixing module may be controlled to heat according to the third temperature. The difference between the time point t0 and the time point t1 may be the second duration ΔT2. That is, the photographic fixing module may be controlled to perform preheating at the third temperature in advance for the second duration ΔT2. At the time point t1, the preheating duration may reach the second duration ΔT2, and the tip sensor may detect that the tip of the recording medium enters the photographic fixing module. Therefore, the timing may be started, and the photographic fixing module may be controlled to perform heating and photographic fixing according to the first temperature. At the time point t2, the timing length may reach the first duration ΔT1 (t2−t1), the photographic fixing module may be controlled to perform heating and photographic fixing according to the second temperature. At the time point t3, the discharge sensor may detect that the end of the recording medium is discharged from the photographic fixing module, and heating and photographic fixing according to the second temperature may be stopped. That is, the photographic fixing module may be controlled to perform heating and photographic fixing according to the second temperature for a third duration ΔT3 (t3−t2).

The first temperature, the second temperature and the third temperature may be all the control temperatures of the heating roller. When the heating roller is controlled to heat and fix at a certain temperature, the heating roller may need to heat for a duration of time before it reaches the temperature, as shown in FIG. 6 and FIG. 8.

In actual applications, the environmental temperature of the image forming device may be different. To effectively save energy while ensuring the photographic fixing firmness, the heating and photographic fixing temperature of the photographic fixing module may be adjusted according to the environmental temperature. In some embodiments, an environmental temperature sensor may be provided on the image forming device, and the environmental temperature may be detected in real time through the environmental temperature sensor.

In one embodiment, the first temperature may be determined according to the environmental temperature. The first temperature may be inversely proportional to the environmental temperature. That is, when the environmental temperature is higher, the first temperature may be lower. In one embodiment, three environmental temperature levels may be set, including a low temperature environment, a normal temperature environment and a high temperature environment. According to the relationship between the environmental temperature and the first temperature, it may be set that: the first temperature corresponding to the low temperature environment>the first temperature corresponding to the normal temperature environment>the first temperature corresponding to the high temperature environment.

In one embodiment, the second temperature may be determined according to the environmental temperature. The second temperature may be inversely proportional to the environmental temperature. That is, when the environmental temperature is higher, the second temperature may be lower. In one embodiment, three environmental temperature levels may be set, including a low temperature environment, a normal temperature environment and a high temperature environment. According to the relationship between the environmental temperature and the second temperature, it may be set that: the second temperature corresponding to the low temperature environment>the second temperature corresponding to the normal temperature environment>the second temperature corresponding to the high temperature environment.

In one embodiment, the third temperature may be determined according to the environmental temperature. The third temperature may be inversely proportional to the environmental temperature. That is, when the environmental temperature is higher, the third temperature may be lower. In one embodiment, three environmental temperature levels may be set, including a low temperature environment, a normal temperature environment and a high temperature environment. According to the relationship between the environmental temperature and the third temperature, it may be set that: the third temperature corresponding to the low temperature environment>the third temperature corresponding to the normal temperature environment>the third temperature corresponding to the high temperature environment.

In one embodiment, to effectively save energy while ensuring the fixation firmness, the second preheating duration ΔT2 may also be adjusted according to the environmental temperature. The second duration ΔT2 may be determined according to the environmental temperature. The second duration ΔT2 may be inversely proportional to the environmental temperature. That is, when the environmental temperature is higher, the second duration ΔT2 may be shorter. In one embodiment, three environmental temperature levels may be set, including a low temperature environment, a normal temperature environment and a high temperature environment. According to the relationship between the environmental temperature and the second duration ΔT2, it may be set that: the second duration ΔT2 corresponding to the low temperature environment>the second duration ΔT2 corresponding to the normal temperature environment>the second duration ΔT2 corresponding to the high temperature environment.

In actual applications, the machine temperature of the image forming device may be different. To effectively save energy while ensuring the photographic fixing firmness, the heating and photographic fixing temperature of the photographic fixing module may be adjusted according to the machine temperature. In some embodiments, a sensor for detecting the temperature of the heating roller 112, that is, a photographic fixing temperature sensor of the machine temperature, may be provided in the photographic fixing module, and the machine temperature may be detected in real time through the photographic fixing temperature sensor.

In one embodiment, the first temperature may be determined according to the machine temperature. The first temperature may be inversely proportional to the machine temperature. That is, when the machine temperature is higher, the first temperature may be lower. In one embodiment, three machine temperature levels may be set, including a low temperature environment, a normal temperature environment and a high temperature environment. According to the relationship between the machine temperature and the first temperature, it may be set that: the first temperature corresponding to the low temperature environment>the first temperature corresponding to the normal temperature environment>the first temperature corresponding to the high temperature environment.

In one embodiment, the second temperature may be determined according to the machine temperature. The second temperature may be inversely proportional to the machine temperature. That is, when the machine temperature is higher, the second temperature may be lower. In one embodiment, three machine temperature levels may be set, including a low temperature environment, a normal temperature environment and a high temperature environment. According to the relationship between the machine temperature and the second temperature, it may be set that: the second temperature corresponding to the low temperature environment>the second temperature corresponding to the normal temperature environment>the second temperature corresponding to the high temperature environment.

In one embodiment, the third temperature may be determined according to the machine temperature. The third temperature may be inversely proportional to the machine temperature. That is, when the machine temperature is higher, the third temperature may be lower. In one embodiment, three machine temperature levels may be set, including a low temperature environment, a normal temperature environment and a high temperature environment. According to the relationship between the machine temperature and the third temperature, it may be set that: the third temperature corresponding to the low temperature environment>the third temperature corresponding to the normal temperature environment>the third temperature corresponding to the high temperature environment.

In one embodiment, to effectively save energy while ensuring the fixation firmness, the second preheating duration ΔT2 may also be adjusted according to the machine temperature. The second duration ΔT2 may be determined according to the machine temperature. The second duration ΔT2 may be inversely proportional to the machine temperature. That is, when the machine temperature is higher, the second duration ΔT2 may be shorter. In one embodiment, three machine temperature levels may be set, including a low temperature environment, a normal temperature environment and a high temperature environment. According to the relationship between the machine temperature and the second duration ΔT2, it may be set that: the second duration ΔT2 corresponding to the low temperature environment>the second duration ΔT2 corresponding to the normal temperature environment>the second duration ΔT2 corresponding to the high temperature environment.

In actual applications, the types of recording medium may be different. For example, the types of recording medium may include: label papers, thick papers, extra thick papers, envelope papers, card stocks, film papers, thin papers, plain papers, thickened plain papers, etc. To effectively save energy while ensuring the photographic fixing firmness, the heating and photographic fixing temperature of the photographic fixing module may be adjusted according to the types of recording medium.

In one embodiment, the first temperature may be determined according to the type of recording medium. For example, a mapping relationship between the first temperature and the types of recording medium may be set, and the first temperature corresponding to each type of recording medium may be determined based on the mapping relationship between the first temperature and the types of recording medium. For example, when the recording medium is an extra-thick paper, the first temperature corresponding to the extra-thick paper may be determined according to the mapping relationship between the first temperature and the types of recording medium.

In one embodiment, the second temperature may be determined according to the type of recording medium. For example, a mapping relationship between the second temperature and the types of recording medium may be set, and the second temperature corresponding to each type of recording medium may be determined based on the mapping relationship between the second temperature and the types of recording medium. For example, when the recording medium is an extra-thick paper, the second temperature corresponding to the extra-thick paper may be determined according to the mapping relationship between the second temperature and the types of recording medium.

In one embodiment, the third temperature may be determined according to the type of recording medium. For example, a mapping relationship between the third temperature and the types of recording medium may be set, and the third temperature corresponding to each type of recording medium may be determined based on the mapping relationship between the third temperature and the types of recording medium. For example, when the recording medium is an extra-thick paper, the third temperature corresponding to the extra-thick paper may be determined according to the mapping relationship between the third temperature and the types of recording medium.

In one embodiment, the second duration ΔT2 may be determined according to the type of recording medium. For example, a mapping relationship between the second duration ΔT2 and the types of recording medium may be set, and the second duration ΔT2 corresponding to each type of recording medium may be determined based on the mapping relationship between the second duration ΔT2 and the types of recording medium. For example, when the recording medium is an extra-thick paper, the second duration ΔT2 corresponding to the extra-thick paper may be determined according to the mapping relationship between the second duration ΔT2 and the types of recording medium.

In the above embodiments, the effects on the first temperature, the second temperature, the third temperature and the second duration ΔT2 are respectively explained from the perspective of a single factor among ambient temperature, machine temperature and the type of recording medium. In practical applications, those skilled in the art may determine the first temperature, the second temperature, the third temperature and the second duration ΔT2 by combining two or more factors including ambient temperature, machine temperature, or the type of recording medium.

In the above embodiments, the photographic fixing temperature control method is explained using one page of recording medium as examples. In actual application scenarios, the image forming operation instructions received by the image forming device may usually include image forming operations for a plurality of pages of recording medium. To further save energy, a photographic fixing temperature control method may be configured for each page of recording medium according to the characteristics of each page of recording medium, which will be described in detail below with reference to specific embodiments.

Figure 9:
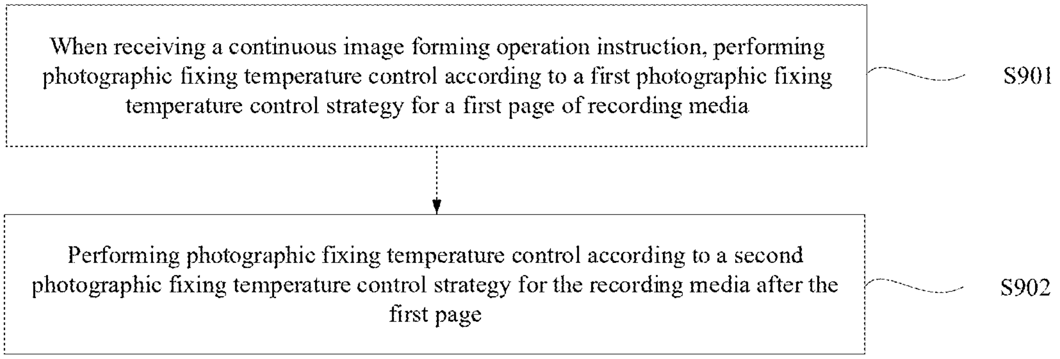
FIG. 9 illustrates a flowchart of another exemplary photographic fixing temperature control method according to various disclosed embodiments of the present disclosure.

In one embodiment shown in FIG. 9 which is a flowchart of another photographic fixing temperature control method according to the present embodiment, the method may be applied to the image forming device shown in FIG. 1, and may include:

S901: when a continuous image forming operation instruction is received, performing photographic fixing temperature control according to a first photographic fixing temperature control strategy for a first page of recording media; and

S902: performing photographic fixing temperature control according to a second photographic fixing temperature control strategy for the recording media after the first page.

In one embodiment, the first photographic fixing temperature control strategy may be the photographic fixing temperature control method shown in FIG. 7. That is, for the first page of the recording media, the photographic fixing module may be controlled to heat for the second time duration ΔT2 according to the third temperature. Then, the photographic fixing module may be controlled to heat and fix the first part of the recording medium according to the first temperature. Finally, the photographic fixing module may be controlled to heat and fix the second part of the recording medium at a second temperature. For the specific content of the first photographic fixing temperature control strategy, reference may be made to the previous embodiments and no details will be described again here.

In one embodiment, the second photographic fixing temperature control strategy may be the photographic fixing temperature control method shown in FIG. 2. That is, for the recording media after the second first page (the second page is included), the photographic fixing module may be controlled to heat and fix the first part of the recording medium according to the first temperature. Then, the photographic fixing module may be controlled to heat and fix the second part of the recording medium at a second temperature. For the specific content of the second photographic fixing temperature control strategy, reference may be made to the previous embodiments and no details will be described again here.

By comparing the first photographic fixing temperature control strategy and the second photographic fixing temperature control strategy, there may be no “preheating” in the second photographic fixing temperature control strategy. Since the photographic fixing module is always in a heated state during the continuous image formation operation, the photographic fixing module may only need to be preheated before the tip of the first page of recording medium enters the photographic fixing module to ensure the photographic fixing firmness of the first page of recording medium. Before the tip of the subsequent pages of recording medium enters the photographic fixing module, there may be no need to preheat the photographic fixing module, to further save energy.

In the second photographic fixing temperature control strategy, the same page of recording medium may be heated and fixed at different temperatures, and temperature compensation may be performed for heating and photographic fixing of the rear part of the page of recording medium. When the image forming device has been running for a duration of time, the temperature of the photographic fixing module may tend to be stable. Even when temperature compensation is not performed for heating and photographic fixing of the rear part of the page of recording medium, the photographic fixing firmness of the recording medium may still be ensured. Obviously, if we continue to perform temperature compensation for heating and photographic fixing of the rear part of the page of recording medium at this time, it will cause a waste of energy.

Correspondingly, the present disclosure also provides another photographic fixing temperature control method.

Figure 10:
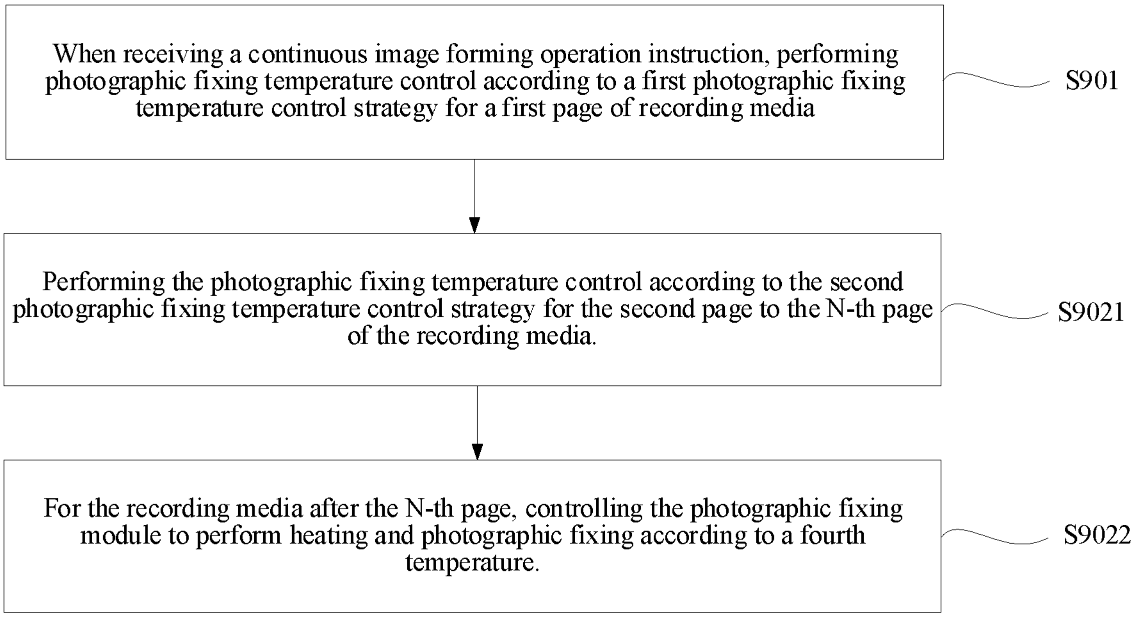
FIG. 10 illustrates a flowchart of another exemplary photographic fixing temperature control method according to various disclosed embodiments of the present disclosure.

As shown in FIG. 10, which is a schematic flow chart of another photographic fixing temperature control method provided by the present disclosure, in one embodiment, S902 may include:

S9021: for the recording media from the second page to the N-th page, performing photographic fixing temperature control according to the second photographic fixing temperature control strategy, where N is a positive integer, and N>2; and

S9022: for the recording media after the N-th page, controlling the photographic fixing module to heat and fix at a fourth temperature.

The fourth temperature may be lower than the first temperature. That is, in the present embodiment, temperature compensation may be performed for the heating and photographic fixing of the recording media from the second page to the N-th page. After completing the image forming operation on the recording media of the N-th page, the temperature of the photographic fixing module may be already high enough. Therefore, the recording media after the N-th page may be heated and fixed at the fourth temperature lower than the first temperature. Further, the fourth temperature may be higher than the preheated third temperature. It is understandable that this photographic fixing temperature control method may further save energy. It should be noted that those skilled in the art may set the value of N according to actual application scenarios, and the embodiments of the present disclosure do not limit this.

Further, after completing the heating and photographic fixing of the last page of the recording medium in the continuous image forming operation instruction, the photographic fixing module may be controlled to stop heating, such that the temperature of the photographic fixing module gradually returns to the ambient temperature, as shown in the temperature curves in FIG. 6 to FIG. 8 after the time point t3.

Figure 11:
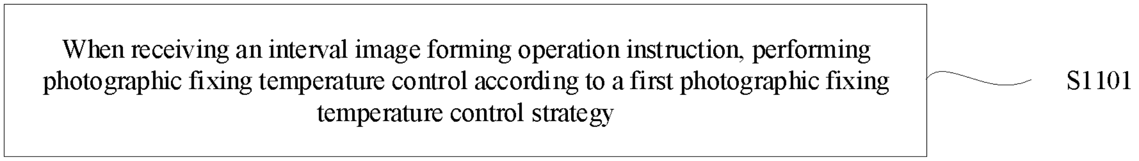
FIG. 11 illustrates a flowchart of another exemplary photographic fixing temperature control method according to various disclosed embodiments of the present disclosure.

In one embodiment shown in FIG. 11 which is a flowchart of another photographic fixing temperature control method according to the present embodiment, the method may be applied to the image forming device shown in FIG. 1, and may include:

S1101: when an interval image forming operation instruction is received, performing photographic fixing temperature control according to a first photographic fixing temperature control strategy.

In one embodiment, the first photographic fixing temperature control strategy may be the photographic fixing temperature control method shown in FIG. 7. For the specific content of the first photographic fixing temperature control strategy, reference may be made to the previous embodiments and no details will be described again here.

In the interval image forming operation, after the image forming device completes the image forming operation on the recording medium of the previous page, it may need to wait for a duration of time before performing the image forming operation on the recording medium of the next page. Although the photographic fixing module is in a heated state during the execution of the image forming operation for the previous page recording medium, it may gradually cool down to a lower temperature (for example, lower than the preheated third temperature) after an "interval duration"), causing the photographic fixing module to still need to be preheated before the tip of the next page of recording media enters the photographic fixing module. In the present embodiment, the photographic fixing module may be preheated before the tip of each page of recording medium enters the photographic fixing module, which may ensure the photographic fixing firmness of each page of recording medium.

In some embodiments, in actual applications, after the duration of time, the photographic fixing module may not be cooled to a lower temperature (for example, equal to or higher than the third preheated temperature). Obviously, at this time, when the photographic fixing module is continued to be preheated before performing the image forming operation on the next page of recording medium, energy will be wasted.

Correspondingly, the present disclosure provides another photographic temperature control method.

Figure 12:
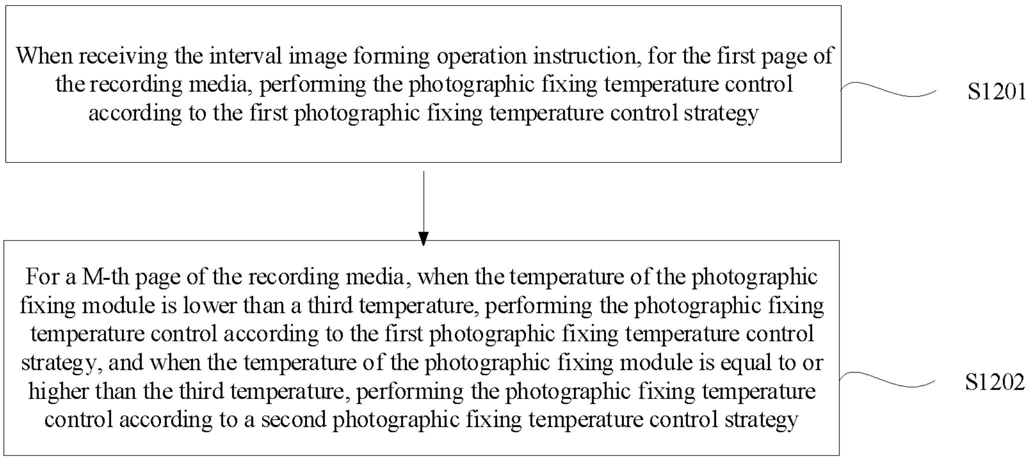
FIG. 12 illustrates a flowchart of another exemplary photographic fixing temperature control method according to various disclosed embodiments of the present disclosure.

In one embodiment shown in FIG. 12 which is a flowchart of another photographic fixing temperature control method according to the present embodiment, the method may be applied to the image forming device shown in FIG. 1, and may include:

- S1201: when an interval image forming operation instruction is received, for the first page of the recording medium, performing photographic fixing temperature control according to the first photographic fixing temperature control strategy; and
- S1202: for the M-th page of the recording media, performing photographic fixing temperature control according to the first photographic fixing temperature control strategy when the temperature of the photographic fixing module is lower than the third temperature, and performing photographic fixing temperature control according to the second photographic fixing temperature control strategy when the temperature of the photographic fixing module is higher than or equal to the third temperature, where M is a positive integer and M≥2.

In the embodiments of the present disclosure, the first fixing temperature control strategy may be the fixing temperature control method shown in FIG. 7. For the specific content of the first fixing temperature control strategy, references may be made to the description of the above embodiments. For the sake of simplicity, no details will be described again here.

Since the fixing module may be in an unheated state before the leading end of the recording medium on the first page enters the fixing module, preheating the fixing module at this time may ensure the fixing firmness of the recording medium on the first page.

In one embodiment, the second photographic fixing temperature control strategy may be the photographic fixing temperature control method shown in FIG. 2. For the specific content of the second photographic fixing temperature control strategy, reference may be made to the previous embodiments and no details will be described again here.

By comparing the first photographic fixing temperature control strategy and the second photographic fixing temperature control strategy, there may be no "preheating" in the second photographic fixing temperature control strategy. In the present disclosure, before the tip of the M-th page of the recording medium enters the photographic fixing module, the temperature of the photographic fixing module may be compared to the third temperature of preheating. When the temperature of the photographic fixing module is lower than the third temperature, the photographic fixing module may be cooled to a lower temperature and may need preheating. Therefore, the photographic fixing temperature control may be performed according to the first photographic fixing temperature control strategy, to ensure the photographic fixing firmness. When the temperature of the photographic fixing module is higher than or equal to the third temperature, the photographic fixing module may not be cooled to a lower temperature and may need preheating. Therefore, the photographic fixing temperature control may be performed according to the second photographic fixing temperature control strategy, to save energy.

Further, after completing the heating and photographic fixing of the last page of the recording medium in the continuous image forming operation instruction, the photographic fixing module may be controlled to stop heating, such that the temperature of the photographic fixing module gradually returns to the ambient temperature, as shown in the temperature curves in FIG. 6 to FIG. 8 after the time point t3.

The present disclosure also provides an image forming device.

Figure 13:
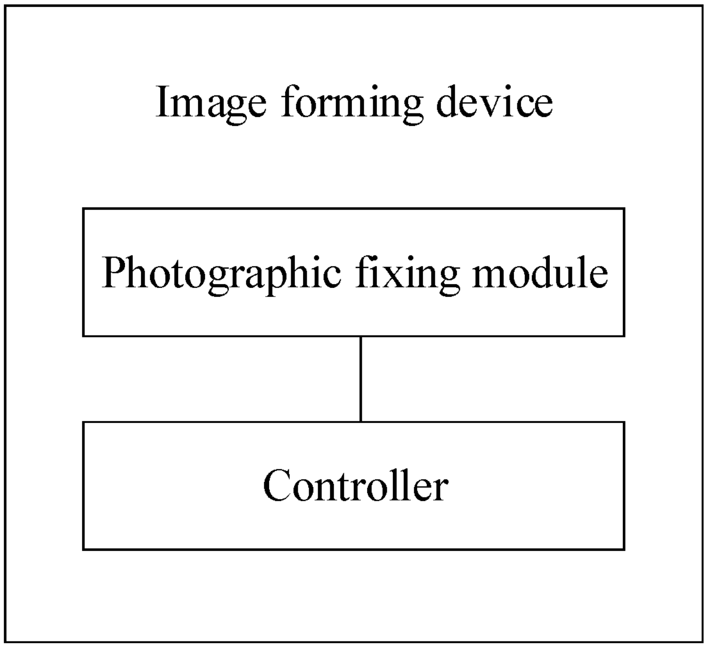
FIG. 13 illustrates a structure of an exemplary image forming device according to various disclosed embodiments of the present disclosure.

As shown in FIG. 13 which is a structure of an exemplary image forming device, in one embodiment, the image forming device may include a photographic fixing module and a controller. The controller may be configured to execute all or a part of the photographic fixing temperature control method provided by various embodiments of the present disclosure.

In one embodiment, the image forming device may further include an environmental temperature sensor for detect the environmental temperature.

For the details of the image forming device provided by the present disclosure, reference may be made to the above embodiments about the photographic fixing temperature control method.

The present disclosure also provides a non-transitory computer-readable storage medium. The computer-readable storage medium may be configured to store a program. When the program is executed, a device where the storage medium is located may be controlled to execute all or a part of the photographic fixing temperature control method provided by various embodiments of the present disclosure. The computer-readable storage medium may be a magnetic disk, an optical disk, a read-only memory (ROM), or a random access memory (RAM).

The present disclosure also provides a computer program product. The computer program product may include computer executable instructions. When the instructions are executed by a computer, the computer may be controlled to execute all or a part of the photographic fixing temperature control method provided by various embodiments of the present disclosure.

The embodiments disclosed herein are exemplary only. Other applications, advantages, alternations, modifications, or equivalents to the disclosed embodiments are obvious to those skilled in the art and are intended to be encompassed within the scope of the present disclosure. In some cases, the actions or steps recited in the present disclosure may be performed in an order different from that in the embodiments and still achieve desirable results. In addition, the processes depicted in the accompanying figures do not necessarily require the particular order shown, or sequential order, to achieve desirable results. Multitasking and parallel processing may be also possible or may be advantageous in certain embodiments.

Any process or method descriptions in flowcharts or otherwise described herein may be understood to represent modules, segments or portions of code comprising one or more executable instructions for implementing custom logical functions or steps of a process, and the scope of preferred embodiments of this specification includes alternative implementations in which functions may be performed out of the order shown or discussed, including in substantially simultaneous fashion or in reverse order depending on the functions involved.

In the present disclosure, the disclosed systems, devices or methods can be implemented in other ways. For example, the device embodiments described above are only illustrative. For example, the division of the units is only a logical function division. In actual implementation, there may be other division methods. For example, multiple units or components may be combined or may be integrated into another system, or some features may be ignored or not implemented. In another point, the mutual coupling or direct coupling or communication connection shown or discussed may be through some interfaces, and the indirect coupling or communication connection of devices or units may be in electrical, mechanical or other forms. Each functional unit in each embodiment of the present disclosure may be integrated into one processing unit, or each unit may exist separately physically, or two or more units may be integrated into one unit. The above-mentioned integrated units can be implemented in the form of hardware, or in the form of hardware plus software functional units.

The integrated units implemented in the form of software functional units may be stored in a non-transitory computer-readable storage medium. The above-mentioned software functional units may be stored in a storage medium, including several instructions to enable a computer device (which may be a personal computer, a connector, or a network device, etc.) or a processor to execute a portion of the methods described in each embodiment of the present disclosure. The aforementioned storage media may include medium that can store program code such as a flash disk, a mobile hard disk, read-only memory (ROM), random access memory (RAM), magnetic disk or optical disc, etc.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A photographic fixing temperature control method, comprising:

controlling a photographic fixing module to heat and fix a first part of a first page of a recording medium according to a first temperature; and controlling the photographic fixing module to heat and fix a second part of the first page of the recording medium according to a second temperature, wherein the first part of the first page is located in front of the second part of the first page and the first temperature is lower than the second temperature, wherein before controlling the photographic fixing module to heat and fix the first part of the first page of the recording medium according to the first temperature, the method further comprises controlling the photographic fixing module to heat for a second duration according to a third temperature, wherein the third temperature is lower than the first temperature and further lower than the second temperature, and wherein the method further comprises:

controlling the photographic fixing module to heat and fix a first part of a page for a second page to a N-th page of the recording media according to the first temperature;

controlling the photographic fixing module to heat and fix a second part of the page for the second page to the N-th page of the recording media according to the second temperature; and for the recording media after the N-th page, controlling the photographic fixing module to perform heating and photographic fixing according to a fourth temperature.

2. The method according to claim 1, wherein:

controlling the photographic fixing module to heat and fix the first part of the recording medium according to the first temperature includes: when a front end of the recording medium enters the photographic fixing module, controlling the photographic fixing module to heat the first part for a first duration according to the first temperature, such that the photographic fixing module heats and fixes the first part of the recording medium according to the first temperature; and controlling the photographic fixing module to heat and fix the second part of the recording medium according to the second temperature includes: after the photographic fixing module is heated for the first duration according to the first temperature, controlling the photographic fixing module to heat and fix the second part of the recording medium according to the second temperature.

3. The method according to claim 1, before controlling the photographic fixing module to heat and fix the first part of the recording medium according to the first temperature, further including:

determining the first temperature according to environmental temperature, machine temperature and/or a type of the recording medium, wherein the first temperature is inversely proportional to the environmental temperature, and the first temperature is inversely proportional to the machine temperature.

4. The method according to claim 1, before controlling the photographic fixing module to heat and fix the second part of the recording medium according to the second temperature, further including:

determining the second temperature according to environmental temperature, machine temperature and/or a type of the recording medium, wherein the second temperature is inversely proportional to the environmental temperature, and the second temperature is inversely proportional to the machine temperature.

5. The method according to claim 1, before controlling the photographic fixing module to heat for the second duration according to the third temperature, further including:

determining the third temperature according to environmental temperature, machine temperature and/or a type of the recording medium, wherein the third temperature is inversely proportional to the environmental temperature, and the third temperature is inversely proportional to the machine temperature.

6. The method according to claim 1, before controlling the photographic fixing module to heat for the second duration according to the third temperature, further including:

determining the second duration according to environmental temperature, machine temperature and/or a type of the recording medium, wherein the second duration is inversely proportional to the environmental temperature, and the second duration is inversely proportional to the machine temperature.

7. A photographic fixing temperature control method, comprising:

when receiving a continuous image forming operation instruction, performing photographic fixing temperature control according to a first photographic fixing temperature control strategy for a first page of a recording media; and performing photographic fixing temperature control according to a second photographic fixing temperature control strategy for the recording media after the first page, wherein:

the first photographic fixing temperature control strategy includes: controlling a photographic fixing module to heat for a second duration according to a third temperature; controlling the photographic fixing module to heat and fix a first part of the first page of the recording medium according to a first temperature; and controlling the photographic fixing module to heat and fix a second part of the first page of the recording medium according to a second temperature, wherein the first part is located in front of the second part, the first temperature is lower than the second temperature, and the third temperature is lower than the first temperature and further lower than the second temperature;

the second photographic fixing temperature control strategy includes: controlling the photographic fixing module to heat and fix a first part of a page of the recording medium after the first page of the recording medium according to the first temperature; and controlling the photographic fixing module to heat and fix a second part of the page of the recording medium after the first page of the recording medium according to a second temperature; and performing the photographic fixing temperature control according to the second photographic fixing temperature control strategy for the recording media after the first page includes:

performing the photographic fixing temperature control according to the second photographic fixing temperature control strategy for the second page to the N-th page of the recording media; and for the recording media after the N-th page, controlling the photographic fixing module to perform heating and photographic fixing according to a fourth temperature.

8. The method according to claim 7, further comprising:

after completing the heating and photographic fixing a last page of the recording media in the continuous image forming operation instruction, controlling the photographic fixing module to stop heating.

* * * * *